US 6,608,948 B2

(12) United States Patent
Delisle et al.

(10) Patent No.: US 6,608,948 B2
(45) Date of Patent: Aug. 19, 2003

(54) PERIODIC ARRAYED WAVEGUIDE GRATING MULTIPLEXER/ DEMULTIPLEXER

(75) Inventors: Vincent Delisle, Ottawa (CA); Alan J. P. Hnatiw, Stittsville (CA)

(73) Assignee: JDS Fitel Inc., Ottawa (CA)

( * ) Notice: Subject to any disclaimer, the term of this patent is extended or adjusted under 35 U.S.C. 154(b) by 0 days.

(21) Appl. No.: 10/014,354

(22) Filed: Dec. 14, 2001

(65) Prior Publication Data

US 2002/0114560 A1 Aug. 22, 2002

(30) Foreign Application Priority Data

Dec. 18, 2000 (CA) .............................. 2328696

(51) Int. Cl.$^7$ .............................. G02B 6/28; G02B 6/34
(52) U.S. Cl. .............................. 385/24; 385/14; 385/37; 359/115; 359/124; 359/130
(58) Field of Search .................... 385/24, 37, 129–132, 385/14; 359/130, 115, 124

(56) References Cited

U.S. PATENT DOCUMENTS

| | | | |
|---|---|---|---|
| 5,002,350 A | | 3/1991 | Dragone |
| 5,136,671 A | | 8/1992 | Dragone |
| 5,732,171 A | * | 3/1998 | Michel et al. ................. 385/27 |
| 5,745,612 A | * | 4/1998 | Wang et al. ................... 385/24 |
| 5,809,184 A | * | 9/1998 | Doerr et al. ................... 385/11 |
| 6,111,996 A | * | 8/2000 | Thompson ................... 385/24 |
| 6,137,939 A | * | 10/2000 | Henry et al. ................. 385/132 |
| 6,144,783 A | * | 11/2000 | Epworth et al. .............. 385/24 |
| 6,205,273 B1 | * | 3/2001 | Chen ........................... 385/37 |
| 6,236,781 B1 | * | 5/2001 | Doerr et al. ................... 385/37 |
| 6,243,514 B1 | * | 6/2001 | Thompson ................... 385/37 |
| 6,263,127 B1 | * | 7/2001 | Dragone et al. .............. 385/24 |
| 6,266,464 B1 | * | 7/2001 | Day et al. ..................... 385/37 |
| 6,298,186 B1 | * | 10/2001 | He ............................... 385/37 |
| 6,301,409 B1 | * | 10/2001 | Whiteaway et al. .......... 385/37 |
| 6,374,013 B1 | * | 4/2002 | Whiteaway et al. .......... 385/37 |
| 6,393,170 B1 | * | 5/2002 | Nakajima et al. ............. 385/14 |
| 6,404,946 B1 | * | 6/2002 | Nakajima et al. ............. 385/24 |
| 6,415,071 B1 | * | 7/2002 | Saito et al. ................... 385/24 |
| 6,421,478 B1 | * | 7/2002 | Paiam .......................... 385/24 |
| 6,434,292 B1 | * | 8/2002 | Kim et al. ..................... 385/24 |
| 6,442,308 B1 | * | 8/2002 | Han et al. ..................... 385/24 |
| 6,442,311 B1 | * | 8/2002 | Barbarossa et al. .......... 385/37 |
| 6,445,847 B1 | * | 9/2002 | Doerr ........................... 385/24 |
| 6,445,853 B1 | * | 9/2002 | Kashihara et al. ............ 385/37 |

OTHER PUBLICATIONS

"Transmission Characteristics of Arrayed Waveguide N×N Wavelength Multiplexer" by Hiroshi Takahashi and Hiroma Toba. Journal of Lightwave Technology, vol. 13, No. 3, Mar. 1995.

* cited by examiner

Primary Examiner—Brian Healy
Assistant Examiner—Daniel Petkovsek
(74) Attorney, Agent, or Firm—Neil Teitelbaum

(57) ABSTRACT

The invention disclosed relates to a device for multiplexing/demultiplexing a multi-band DWDM system, providing reduced insertion losses. The device comprises first and second planar waveguides, a light dispersive element having a periodic frequency spectrum, interconnecting the first and second planar waveguides, a plurality of N input waveguides, connected to the first planar waveguide, and a plurality of M output waveguides, connected to the second planar waveguide, wherein the M outputs are each separated by a frequency interval $\Delta f$, the N inputs are each separated by substantially $M*\Delta f$, the free spectral range (FSR) equals substantially $N*M*\Delta f$, where N is an integer greater than 1, and M is an integer equal to or greater than N. In one embodiment of the invention, wherein the telecommunications window is divided into a plurality of sub-bands of M channels, a temperature controller is included to provide individual temperature set points for each sub-band, to reduce wavelength centering errors.

12 Claims, 3 Drawing Sheets

PERIODIC ARRAYED WAVEGUIDE GRATING MULTIPLEXER/DEMULTIPLEXER

FIELD OF THE INVENTION

The present invention relates to periodic arrayed waveguide grating multiplexer/demultiplexers, particularly multiplexer/demultiplexers for separating periodic sub-bands bands of multiple channels.

BACKGROUND OF THE INVENTION

Optical telecommunications systems currently utilize dense wavelength division multiplexing (DWDM) to transmit multiple optical signals at different wavelengths in order to increase the available bandwidth of the optical fiber network. In the past few years, the number of channels of DWDM systems has dramatically increased from a few channels to more than one hundred channels.

A maximum capacity system is not always required. Service providers would prefer to provide a lower cost system that can be expanded as demands require. To increase flexibility in the optical telecommunications network, service providers propose dividing the communications window into multiple channel sub-bands, which can be addressed modularly as system hardware upgrades are required.

To support a modular sub-band system, a multiplexer/demultiplexer adapted for use with sub-bands of multiple channels smaller than the whole DWDM system is required.

For practical reasons, this discussion refers to 40 channels of the optical telecommunications window at the standardized 100 GHz ITU channel spacing. It is understood, however, that this is just an application example and that a larger or smaller number of channels and different channel spacing can just as easily be accommodated.

An arrayed waveguide grating (AWG) is a dispersive optical device suitable for multiplexing and demultiplexing a large number of channels simultaneously. Channel signals on each channel of a 40 channel system can be multiplexed and demultiplexed in a single AWG.

Selecting an appropriate multiplexer/demultiplexer for a modular system of multi-channel sub-bands introduces difficulties for the service provider in hardware costs and complexity. If only a small subset of all the channels must be multiplexed/demultiplexed, then unnecessary losses and complexity are introduced by using a large device to multiplex/demultiplex the whole set of channels. Furthermore, using a large capacity AWG to pick up only a selected smaller subset of channels, requires a large switching router to couple the selected outputs. Alternatively, an AWG can be designed and optimized for any specific subset of channels. However, for the service provider to provide service at a selected sub-band of channels and later add service for additional sub-bands, it is costly and inconvenient to maintain a specific AWG for each multi-channel sub-band.

Thus, it is desired to provide a single multiplexer/demultiplexer that can multiplex/demultiplex any selected multiple channel sub-band of a plurality of sub-bands. Since the AWG is a periodic device in frequency, it can be used to address more than one sub-band, given that the sub-bands are equal to the free spectral range (FSR) of the AWG. However, this is not sufficient to design a suitable multiplexer/demultiplexer, because unacceptable losses are experienced in such a device. A better multiplexer/demultiplexer is still needed to provide a modular system of multiple channel sub-bands.

A prior art device is described in a paper, Transmission Characteristics of Arrayed Waveguide N×N Wavelength Multiplexer by H. Takahashi et al., Journal of Lightwave Technology, Vol. 13, No. 3, March 1995. In the device described, a router is constructed having a same number (N) of input and output waveguides. The N×N routing is achieved by using the periodicity of an AWG. By selecting different inputs, an order of output channels can be shifted. Each output has periodic pass frequencies for routing any one channel of a multiplexed signal to any output. In this device, the N×N connection is provided when $FSR=N*\Delta F$, wherein $\Delta f$ is the frequency channel spacing set at 100 GHz. An insertion loss of 3 dB is claimed.

SUMMARY OF THE INVENTION

The present invention has found that by designing a periodic dispersive element, particularly an arrayed waveguide grating with an FSR broader than the selected sub-band width by a multiple corresponding to a number of inputs greater than one, any selected multiple channel sub-band in the range of wavelengths of interest can be multiplexed or demultiplexed. And further, that by optimizing the number of inputs and outputs, losses can be significantly reduced.

Accordingly, the present invention provides an optical multiplexer/demultiplexer for multiplexing/demultiplexing any selected sub-band of M adjacent channels of optical frequencies from a plurality of sub-bands comprising:

a first planar waveguide;

a second planar waveguide;

an arrayed waveguide grating optically coupling the first and second planar waveguides having a periodic free spectral range;

a plurality of spaced apart waveguide inputs N coupled to the first planar waveguide, the N inputs for launching complementary sub-band frequencies of adjacent channels in a demultiplexer mode of operation, or for outputting a multiplexed band of adjacent channels in a multiplexing mode of operation;

a plurality of spaced apart waveguide outputs M coupled to the second planar waveguide for receiving demultiplexed output channel frequencies of an input sub-band in a demultiplexer mode of operation, or for launching a plurality of adjacent channel frequencies in a multiplexing mode of operation;

wherein the M outputs are separated to provide a spectral frequency interval $\Delta f$, the inputs are separated to provide complementary input sub-band frequencies each spectrally separated by substantially $M*\Delta f$, and the free spectral range of the device equals substantially $N*M*\Delta f$.

Advantageously, the arrayed waveguide grating in accordance with the present invention can provide multiplexing/demultiplexing functionality for any channel sub-band over a broad channel spectrum.

Further advantages of the present invention will be apparent to those of skill in the art from the following figures, which illustrate preferred examples of the invention by example only.

DETAILED DESCRIPTION OF PREFERRED EMBODIMENTS

Figure 1:
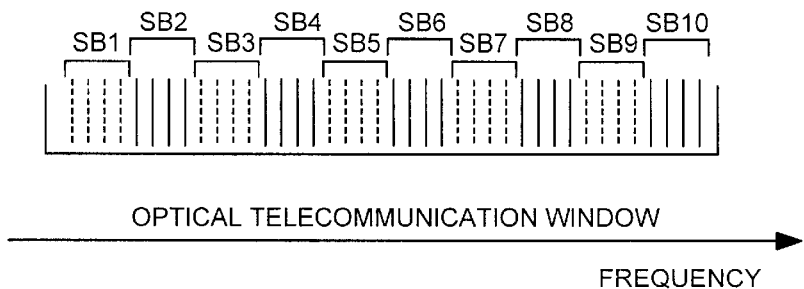
FIG. 1 graphically illustrates a multi-band DWDM system divided into sub-bands.

FIG. 1 shows a 40 channel telecommunications window divided into 10 sub-bands SB1 . . . SB10 of four channels each, the channels being separated by the standardized 100 GHz spacing. This division into sub-bands of four channels is arbitrary, and any number of adjacent channels can be selected in accordance with the present invention.

Figure 2:
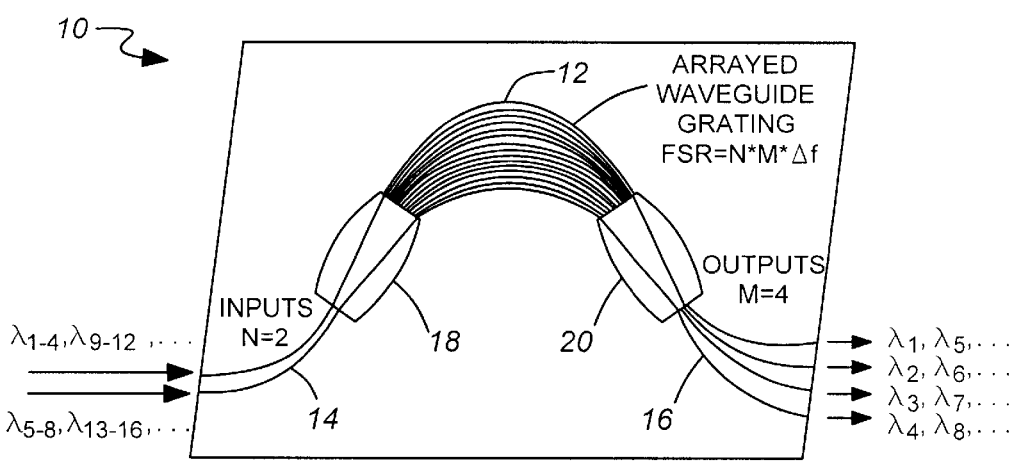
FIG. 2 illustrates an arrayed waveguide grating having multiple inputs and multiple outputs in accordance with the present invention.

FIG. 2 shows an illustrative embodiment of a multiplexer/demultiplexer device 10 according to the invention, including an arrayed waveguide grating 12 comprising a plurality of unequal length waveguides, a plurality of input waveguides 14, a plurality of output waveguides 16, and first and second planar waveguides 18 and 20, respectively. The entire device may be integrated on the same substrate chip using known techniques. The first and second planar waveguides 18 and 20 are interconnected by an AWG 12 in which the lengths of adjacent waveguides 22 differ by a constant value, or a selected function, and increase geometrically from one side to the other, as provided for in the design. This structure produces an output response that is periodic in frequency.

The periodic response can be described as the free spectral range (FSR) of the device. The FSR is shown as a frequency period in FIG. 3 as 800 GHz. In order to design a multiplexer/demultiplexer suitable for all sub-bands in a wavelength range of interest, the FSR should, one would assume, be limited to frequency range to incorporate one sub-band of channels, for example for a four channel system an FSR=400 GHz. Then with only one input 14, the periodicity (FSR) will cause each channel of a sub-band to be demultiplexed to an output 16 of the device 10, at different orders of the grating for every sub-band. However, high losses in the range of 3 dB attributed as roll-off would be experienced in such a system. This can be explained by the maximum power envelope defined by the FSR that normally has a Gaussian shape between zero loss and −3 dB. The maximum loss occurs in the wavelength regions where the Gaussian function of two adjacent orders overlap. The Gaussian envelope is illustrated as 30 in FIG. 4, as designed for an example of the present invention. The smaller the FSR, the smaller the envelope, and consequently fewer channels can be passed in the low loss portion of the envelope.

Figure 3:
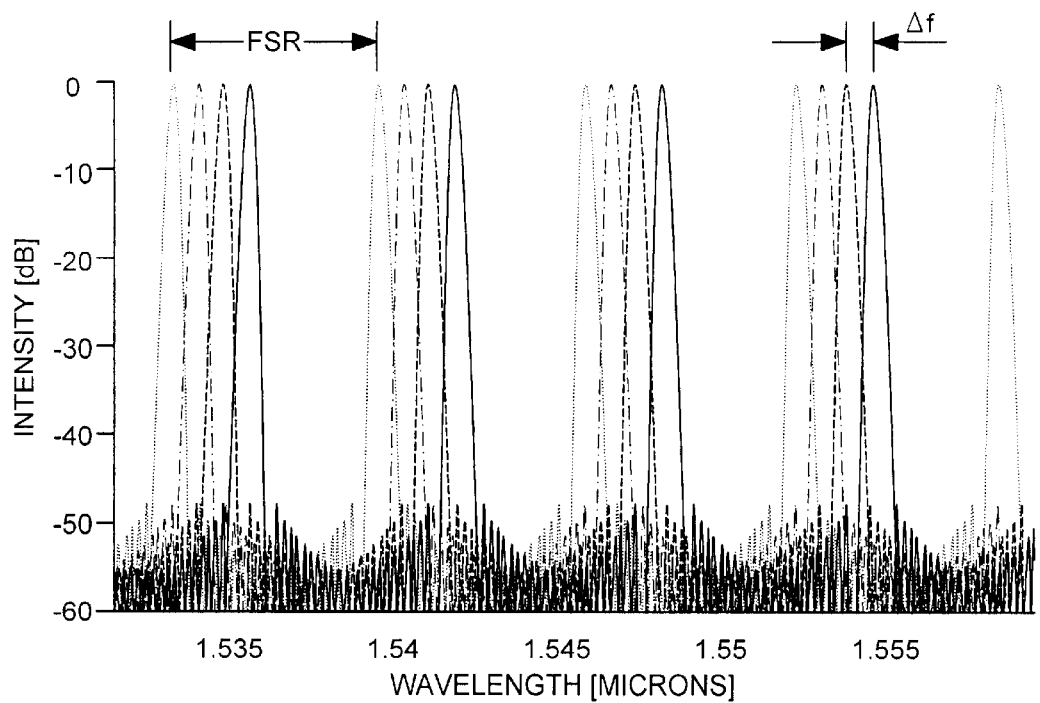
FIG. 3 graphically illustrates a first spectral output from the AWG of FIG. 2.
Figure 4:
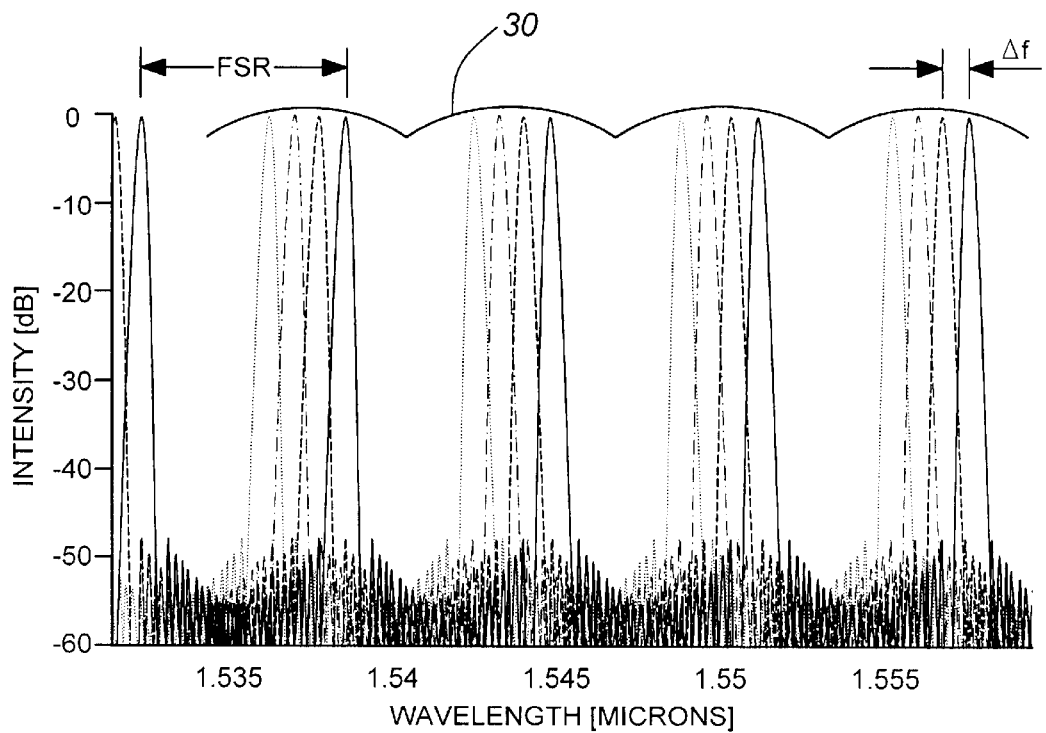
FIG. 4 graphically illustrates a second complementary spectral output from the AWG of FIG. 2.

The present invention has found that the FSR can be broadened to permit more channels to pass within the low loss portion of the envelope, to reduce roll-off losses, if the number of inputs is increased. An output response, as illustrated in FIGS. 3 and 4, results having complementary output sub-bands from each input passed under a broader 800 GHz envelope, as shown in FIG. 4. When the number of inputs is greater than one, input roll-off must also be factored into optimizing calculations. In the example shown in FIGS. 2–4, channel bands of four channels are selected, thus the device 10 has 4 outputs 16. By optimizing input and output roll-off, an optimum number of 2 inputs 14 is selected. Calculations shown in Table 1 of expected roll-off losses for a 4 channel sub-band illustrate how this selection is made.

TABLE 1

| N | M | Input roll-off | Output roll-off | Total losses |
|---|---|---|---|---|
| 1 | 4 | 0 | 1.63 | 1.63 |
|   | 8 | 0 | 2.15 | 2.15 |
|   | 16 | 0 | 2.45 | 2.45 |
| 2 | 4 | .75 | 0.4 | 1.15 |
|   | 8 | .75 | 0.6 | 1.35 |
|   | 16 | .75 | 0.7 | 1.45 |
| 4 | 4 | 1.63 | 0.2 | 1.83 |
|   | 8 | 1.63 | 0.23 | 1.86 |
|   | 16 | 1.63 | 0.28 | 1.91 |

As can be seen in table, the AWG of the present example having 2 inputs and 4 outputs has a calculated combined loss of only 1.15 dB, rather than the 1.63 dB losses of a single input of a 400 GHz FSR grating.

To obtain a multiplexer/demultiplexer designed for all channels, the FSR must be equal to number of inputs N times the number of outputs M times the channel spacing $\Delta f$, where N and M are greater than 1. Thus, FSR=N*M*$\Delta f$. The N input sub-band frequencies must have a spectral separation of M*$\Delta f$; and the M output channel frequencies must have a spectral separation of $\Delta f$. In the illustrated example, N=2, M=4 and $\Delta f$=100 GHz, so the FSR=800 GHz. To achieve a spectral separation of M* $\Delta f$ at the inputs N the design must provide a selected physical separation between the inputs 14 known from the dispersion relation between physical separation in a dispersive element and spectral separation.

In order to configure the device 10 for a selected channel band, the correct input 14 must be selected. This can be done statically connecting the selected input permanently upon installation, or dynamically with a simple 1×N switch, in this case 1×2 (not shown).

Figure 5:
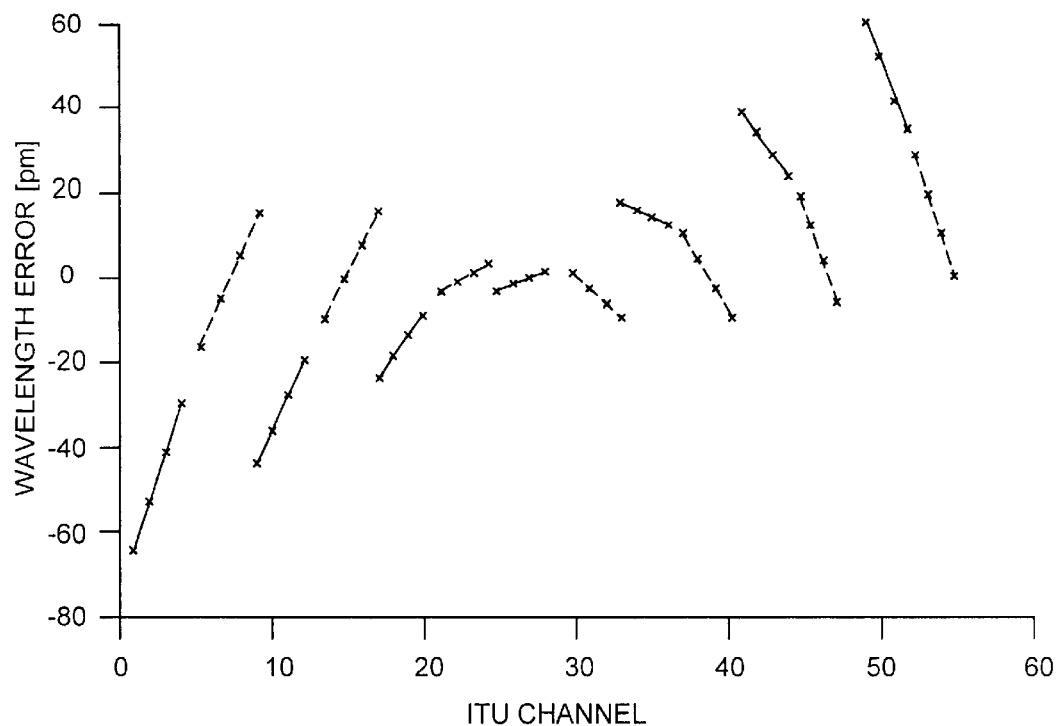
FIG. 5 graphically illustrates a wavelength centering error experienced by the AWG of FIG. 2.

There is a further error that must be compensated for in order to use a same AWG device effectively over the full range of channel bands. As is known in the art, there are only discrete values possible for an FSR of an arrayed waveguide grating. Accordingly, the best FSR selected may not provide channel passbands exactly centered on the ITU grid. As a result, there is an increasing wavelength centering error of the channels that correspond to lower orders of the grating. The problem is graphically illustrated in FIG. 5. FIG. 5 shows the wavelength centering error for a 56 channel system where N=2 and M=4. Each of the linked channel sub-bands is distributed progressively farther from zero displacement about the center wavelength bands. A further unavoidable dispersion error shown in FIG. 5 as the different slopes of the sub-bands, results from using different grating orders which have different wavelength dispersions.

Figure 6:
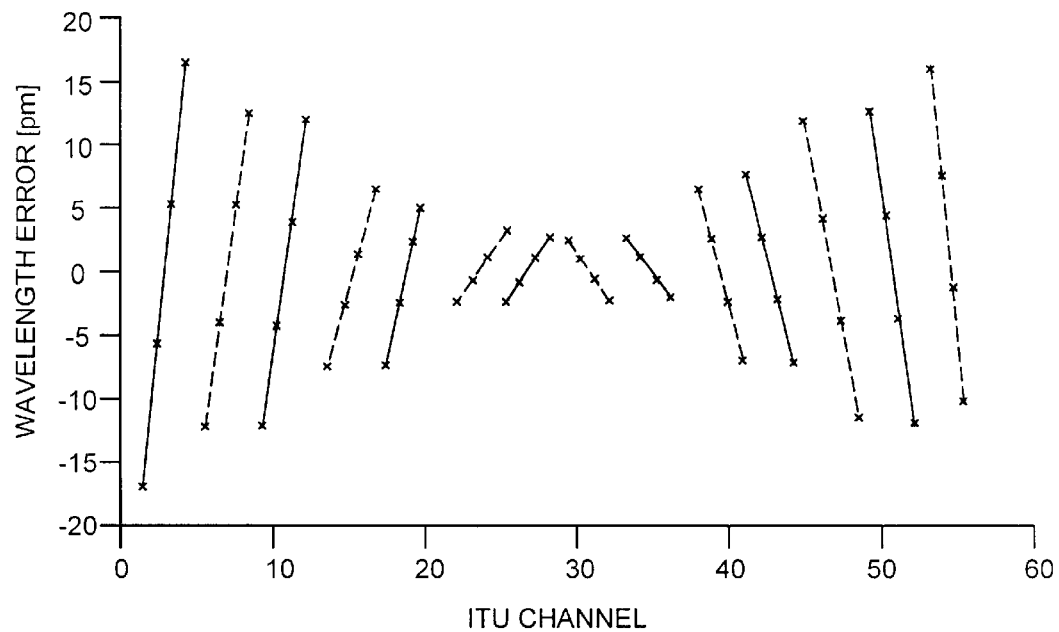
FIG. 6 graphically illustrates the wavelength centering error of FIG. 5 modified by temperature compensation.

From FIG. 6 it can be seen that by providing a different temperature set point for each sub-band, the sub-bands can all be brought to a centered position. The individual set points are obtained by heating or cooling the chip selectively for each sub-band using a temperature controller (not shown). In the present example, a worst wavelength centering error is improved from 68 pm to 18 pm when the AWG temperature set point is adjusted for each sub-band. Other known techniques can also be used to correct the wavelength centering error, such as moving the input position or stressing the device.

It will be appreciated by those skilled in the art that while the invention has been described and illustrated by an AWG, other dispersive elements having a periodic frequency spectrum could also be employed. Bulk optical devices such as diffraction gratings and holographic gratings can be used.

What is claimed is:

1. An optical multiplexer/demultiplexer for multiplexing/demultiplexing any selected sub-band of M adjacent channels of optical frequencies from a plurality of sub-bands comprising:

a first planar waveguide;

a second planar waveguide;

a plurality of spaced apart individually selectable waveguide inputs N coupled to the first planar waveguide, the N inputs being separated to provide complementary input sub-band frequencies each spectrally separated by substantially $M*\Delta f$, the N inputs for launching complementary sub-band frequencies of adjacent channels in a demultiplexer mode of operation, or for outputting a multiplexed band of adjacent channels in a multiplexing mode of operation;

a plurality of spaced apart waveguide outputs M coupled to the second planar waveguide, the M outputs being separated to provide a spectral frequency interval $\Delta f$, for receiving demultiplexed output channel frequencies of an input sub-band in a demultiplexer mode of operation, or for launching a plurality of adjacent channel frequencies in a multiplexing mode of operation; and an arrayed waveguide grating optically coupling the first and second planar waveguides having a periodic free spectral range equal to substantially $N*M*\Delta f$.

2. An optical multiplexer/demultiplexer as defined in claim 1, further including means for selecting an input of the plurality of N inputs for launching a sub-band of M adjacent channels.

3. An optical multiplexer/demultiplexer as defined in claim 2, wherein M>N.

4. An optical multiplexer/demultiplexer as defined in claim 3, wherein N=2 and M=4.

5. An optical multiplexer/demultiplexer as defined in claim 1, further comprising a temperature controller for providing an individual temperature set point for each sub-band.

6. An optical multiplexer/demultiplexer for multiplexing/demultiplexing a plurality of sub-bands of optical channel frequencies, each sub-band having M adjacent channel frequencies comprising:

a periodic dispersive optical element having a free spectral range equal to an integer multiple N times a frequency width of a sub-band of M channels, where N is greater than 1, said periodic light dispersive optical element optically coupling a plurality of individually selectable inputs N, equal to the integer multiple, spatially separated to provide selected input sub-band frequencies spectrally separated by substantially $M*\Delta f$, for launching light into the periodic dispersive optical element in a demultiplexing mode of operation, or for outputting a multiplexed band of adjacent channels in a multiplexing mode of operation; and, a plurality of outputs M, separated to provide a spectral frequency interval of $\Delta f$, for receiving M demultiplexed channels of a sub-band from the periodic dispersive optical element in a demultiplexing mode of operation, or for launching a plurality of adjacent channels into the periodic dispersive optical element in a multiplexing mode of operation.

7. An optical multiplexer/demultiplexer as defined in claim 6, wherein the periodic light dispersive optical element is selected from the group consisting of: an arrayed waveguide grating, a diffraction grating, and a holographic grating.

8. An optical multiplexer/demultiplexer as defined in claim 7, wherein M>N.

9. An optical multiplexer/demultiplexer as defined in claim 8, further comprising a temperature controller for providing an individual temperature set point for each sub-band.

10. A method of demultiplexing a sub-band of M adjacent optical channels from a plurality of optical channels having a channel spacing of $\Delta f$ comprising the steps of:

demultiplexing a sub-band of M multiplexed channels from the plurality of optical channels;

launching the sub-band of M channels into a selected input of a periodic dispersive optical element having a plurality N of inputs spatially separated to provide a spectral separation of substantially $M*\Delta f$ and a plurality M of outputs, spatially separated to receive output spectral frequencies separated by $\Delta f$, and a free spectral range equal to substantially $N*M*\Delta f$;

distributing to the M outputs a periodic order of the dispersive optical element comprising M channel frequencies.

11. A method of demultiplexing a sub-band of M adjacent optical channels as defined in claim 10, further comprising the step of:

demultiplexing an other sub-band of M different multiplexed adjacent optical channels from the plurality of optical channels;

launching the other sub-band of M channels into an other input, of the plurality of inputs N, of the periodic dispersive optical element; and, distributing to the M outputs an other periodic order of the dispersive optical element comprising the M different channel frequencies.

12. A method of demultiplexing a sub-band of M adjacent optical channels as defined in claim 11, including the step of switching an optical coupling between the input and the other input before launching an adjacent sub-band of M optical channels.

* * * * *